F. L. WATSON.
RADIATOR VALVE.
APPLICATION FILED JULY 31, 1908.

914,209.

Patented Mar. 2, 1909.

Witnesses
A. S. May
G. M. Copenhaver

Inventor
Frank L. Watson
by Percy B. Hills
Attorney

UNITED STATES PATENT OFFICE.

FRANK L. WATSON, OF LYNCHBURG, VIRGINIA.

RADIATOR-VALVE.

No. 914,209.  Specification of Letters Patent.  Patented March 2, 1909.

Application filed July 31, 1908. Serial No. 446,330.

*To all whom it may concern:*

Be it known that I, FRANK L. WATSON, a citizen of the United States, residing at Lynchburg, in the county of Campbell, State of Virginia, have invented new and useful Improvements in Radiator-Valves, of which the following is a specification.

Figure 1:
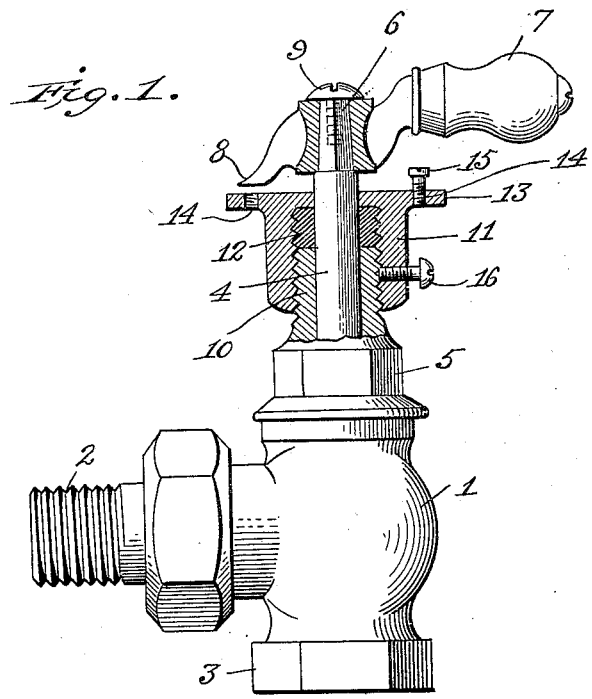
Figure 2:
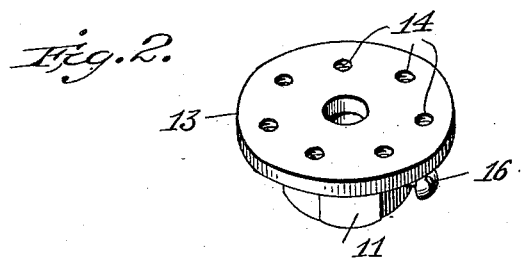

My invention relates to improvements in radiator valves, and has for its object certain improvements in the construction of the same as will be hereinafter more particularly described and claimed, reference being had to the accompanying drawing, in which:

Figure 1 is a side elevation of a radiator valve embodying my improved construction, the upper portion of the same being shown in section. Fig. 2 is a detail perspective view of the combined packing nut and stop plate.

Similar numerals of reference denote corresponding parts in the two views.

In the said drawing the reference numeral 1 denotes the valve body having the usual externally threaded inlet 2 for engagement with the radiator, and the usual internally threaded discharge 3 for connection with the system piping. Any desired form of valve within the body 1 may be employed, which is operated by a valve stem 4 passing through a bonnet piece 5 screwed to said valve body 1, said valve stem having removably mounted on its squared upper end 6 a handle 7 that on its other side is projected into a depending pointer 8, said handle and pointer being retained in position by a screw 9.

The upper end 10 of the bonnet piece 5 is externally screw threaded, and interposed between the same and the handle 7 and pointer 8 is a packing nut 11 in screw threaded engagement with said end 10, and carrying in its upper internal portion a suitable packing 12, the upper portion of said packing nut being reduced to snugly fit around the valve stem 4 and also to retain said packing, and being also extended laterally and annularly at 13 to form a stop plate. Said extension or stop plate is provided circularly with a series of screw threaded apertures 14, into any one of which is adapted to be inserted a screw stop 15, which will lie in the path of rotation of the pointer 8 and by its contact therewith to stop the same.

In operation the valve stem 4 will be stopped in its rotation in one direction in any suitable manner when the valve is closed, but is free to rotate the valve in the opposite direction towards the full open position unless stopped at some intermediate point by the insertion of the stop 15 in one of the holes 14. By this means, when a radiator provided with my improved valve is installed in a system, a preliminary working test will determine the requisite amount of opening of the valve necessary to obtain the best results with that radiator, and the stop 15 may then be inserted into the proper hole 14 to prevent further opening of the valve. Said valve may thereafter at any time be closed to cut off the radiator when no heat is desired, and when again opened for heating purposes will be stopped at the proper point for the most effective results. To prevent the nut 11 from being turned when the pointer 8 contacts with stop 15 I prefer to tap a set-screw 16 through said nut to engage the upper end 10 of bonnet piece 5.

Having thus described my invention, what I claim as new and desire to secure by Letters Patent is:

In a valve, a valve body, a rotatable valve stem projecting therefrom, a handle for operating said valve stem and extended into a depending pointer, a packing nut interposed on said valve body between the same and said handle and having a reduced aperture through which said valve stem passes, an annular stop plate formed integral with said packing nut and circularly apertured at intervals, and a stop adapted to be removably inserted in any one of said apertures, and, when so inserted, to lie in the path of rotation of said pointer to limit the movement thereof.

In testimony whereof, I have hereunto set my hand in the presence of two subscribing witnesses.

FRANK L. WATSON.

Witnesses:
 W. H. LIGGAN,
 J. W. WILKINS.